United States Patent
Sun et al.

(10) Patent No.: US 8,050,213 B2
(45) Date of Patent: Nov. 1, 2011

(54) MESSAGE CODING IN A RELAYED COMMUNICATIONS NETWORK

(75) Inventors: Li-Hsiang Sun, San Diego, CA (US); Sang Gook Kim, San Diego, CA (US); Ki Dong Lee, San Diego, CA (US)

(73) Assignee: LG Electronics, Inc., Seoul (KR)

(*) Notice: Subject to any disclaimer, the term of this patent is extended or adjusted under 35 U.S.C. 154(b) by 575 days.

(21) Appl. No.: 12/211,758

(22) Filed: Sep. 16, 2008

(65) Prior Publication Data

US 2009/0073914 A1    Mar. 19, 2009

Related U.S. Application Data

(60) Provisional application No. 60/972,970, filed on Sep. 17, 2007.

(51) Int. Cl.
*H04B 7/14* (2006.01)
*H04J 1/10* (2006.01)
*H04J 3/08* (2006.01)

(52) U.S. Cl. ......... 370/315; 370/279; 370/492; 370/501

(58) Field of Classification Search .......... 370/279, 370/293, 310, 328, 338, 315, 316, 492, 501, 370/254–255
See application file for complete search history.

(56) References Cited

U.S. PATENT DOCUMENTS

| | | | | |
|---|---|---|---|---|
| 2004/0105414 A1* | 6/2004 | Narayanan et al. | | 370/338 |
| 2007/0155338 A1* | 7/2007 | Hong et al. | | 455/69 |
| 2007/0184826 A1 | 8/2007 | Park et al. | | |
| 2008/0056179 A1* | 3/2008 | Kim et al. | | 370/328 |
| 2008/0291847 A1* | 11/2008 | Zheng | | 370/255 |
| 2010/0054172 A1* | 3/2010 | Boariu et al. | | 370/315 |
| 2010/0110968 A1* | 5/2010 | Lee et al. | | 370/315 |
| 2010/0182932 A1* | 7/2010 | Maheshwarl et al. | | 370/254 |

FOREIGN PATENT DOCUMENTS

KR    10-2006-0057471    5/2006
KR    10-2007-0068824    7/2007

* cited by examiner

*Primary Examiner* — Warner Wong
(74) *Attorney, Agent, or Firm* — Lee, Hong, Degerman, Kang & Waimey

(57) ABSTRACT

A method for relaying a signal in a wireless communication system is provided. The method comprises receiving in at least one of a base station and a relay station information regarding a mobile station group (MSG) of a mobile station, scheduling within a given duration uplink information to be transmitted from a first mobile station and downlink information to be transmitted to at least one mobile station, wherein the first mobile station is in each of the at least one mobile station's MSG, receiving in a relay station the uplink information and the downlink information to be transmitted within the given duration, network coding the uplink information and the downlink information in the relay station, and transmitting from the relay station a network-coded packet, wherein the network-coded packet can be received by the base station and the at least one mobile station.

29 Claims, 13 Drawing Sheets

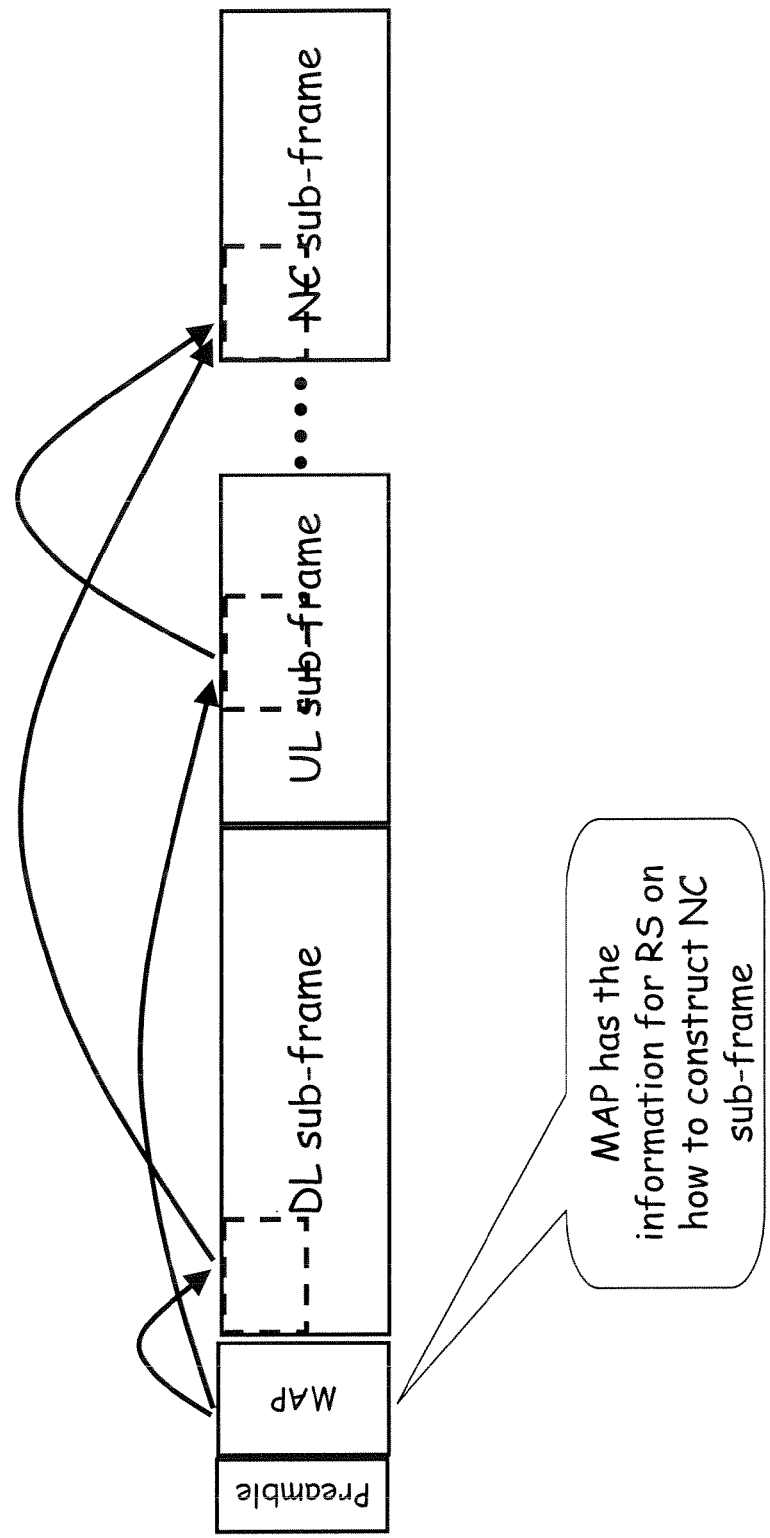

- MS2 failed to decode DL_MS2(1)
- BS failed to decode UL_MS1(1)
- MS2 is in MS1's MSG
- DL_MS2(1) is decoded by MS1 because of MS1's better geometry
- UL_MS1(1) is decoded by MS2 because they are close to each other
- MS1 does not know that MS2 has decoded UL_MS1(1)

FIG. 8B
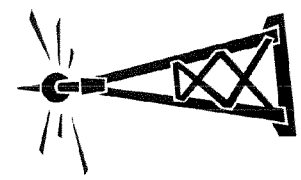
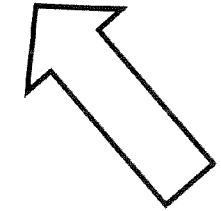
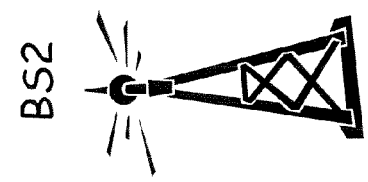
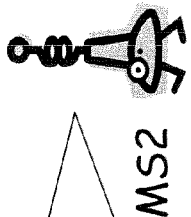
MS1 XORs the interfering packet with its own UL retransmission
MS2 recovers the interfering packet, and uses it for interference cancellation to decode its own packet
The cell uses the UL retransmission in sector 1 as potential DL retransmission in sector 2

MESSAGE CODING IN A RELAYED COMMUNICATIONS NETWORK

CROSS-REFERENCE TO RELATED APPLICATIONS

Pursuant to 35 U.S.C. §119, this application claims the benefit of earlier filing date and right of priority to U.S. Provisional Application No. 60/972,970, filed on Sep. 17, 2007, the contents of which are hereby incorporated by reference herein in entirety.

FIELD OF ART

The present application relates to encoding of messages in a communications network, and more particularly to network coding of messages in the uplink and the downlink directions in the same frame, using a relay station.

BACKGROUND

In a mobile communications network, a mobile station (MS) can communicate with a base station (BS) via a relay station (RS). Typically, communication from the MS to the BS takes place over an uplink (UL) channel, and communication from the BS to the MS takes place over a downlink (DL) channel. In most time-division duplex (TDD) relay communication protocols, an MS may transmit a message intended for the BS to an RS in an UL sub-frame. The RS in turn transmits the message to the BS in an RS UL sub-frame. On the other hand, a BS may transmit a message intended for the MS to the RS in a DL sub-frame. The RS then transmits the message to the MS in an RS DL sub-frame.

The above relay scheme is inefficient, because the MS or the BS will have to schedule each of the uplink or downlink transmissions handled by the RS in separate sub-frames. The transmission throughput of a network implementing such a scheme is limited due to inefficient use of bandwidth (i.e., separate channels need to be used for UL and DL of relayed messages). If network coding is applied at the RS, the bandwidth usage of a relay link can be reduced. However, the reduction may be limited if the scheduling processes of UL and DL are operated independently.

More efficient systems and methods are desirable that can overcome the above-noted shortcomings.

SUMMARY

The present application relates to encoding of messages in a TDD communications network, and more particularly to network coding of messages in the uplink and the downlink directions in the same or previous frames, using a relay station. Additional features and advantages will be set forth in the description which follows, and in part will be apparent from the description, or may be learned by practice of the concepts disclosed herein. The objectives and other advantages of the various embodiments will be realized and attained by the structure particularly pointed out in the written description and claims hereof as well as the appended drawings.

A method for relaying a signal in a wireless communication system is provided. The method comprises receiving in at least one of a base station and a relay station information regarding a mobile station group (MSG) of a mobile station, wherein the MSG comprises a group of neighboring mobile stations from which the mobile station is capable of successfully receiving uplink transmissions; scheduling within a given duration uplink information to be transmitted from a first mobile station and downlink information to be transmitted to at least one mobile station, wherein the first mobile station is in each of the at least one mobile station's MSG; receiving in a relay station the uplink information transmitted from the first mobile station and the downlink information to be transmitted to the at least one mobile station within the given duration; network coding the uplink information and the downlink information in the relay station; and transmitting from the relay station a network-coded packet comprising a network-coded version of the uplink information from the first mobile station and the downlink information to be transmitted to the at least one mobile station, wherein the network-coded packet can be received by the base station and the at least one mobile station.

The information regarding the mobile station group of the mobile station is received periodically at a BS or RS. The information regarding the mobile station group of one mobile station is received asynchronously with the reception of the information regarding the mobile station group of another mobile station. If a second MS overhears an MSG report from the first MS, the second MS can include the first MS in the next MSG report from the second MS. The relay station multicasts the network-coded packet. The base station receives the network-coded packet and recovers the uplink information from the first mobile station. The recovery of the uplink information from the first mobile station is based on previously-transmitted downlink information and the network-coded packet. Desirably, at least one mobile station receives the network-coded packet and recovers the downlink information. In one implementation, the recovery of the downlink information is based on previously-received uplink information from the first mobile station or previously-received downlink information transmitted to the at least one mobile station and the network-coded packet.

In accordance with another embodiment, a method for relaying a signal in a wireless communication system comprises scheduling within a given duration a first uplink transmission from a first mobile station and a downlink transmission transmitted to at least one mobile station, wherein the first mobile station is in each of the at least one mobile station's mobile station group (MSG); receiving in a base station the first uplink transmission from the first mobile station; receiving in the at least one mobile station the downlink transmission from the base station; receiving in a relay station the first uplink transmission from the first mobile station and the downlink transmission to the at least one mobile station; decoding in the relay station the first uplink transmission transmitted from the first mobile station and the downlink transmission to the at least one mobile station; re-encoding in the relay station the uplink transmission and the downlink transmission; network coding in the relay station a portion of the re-encoded uplink transmission and a portion the re-encoded downlink transmission, wherein a network-coded packet is generated from the portion of the re-encoded uplink transmission and the portion the re-encoded downlink transmission; and transmitting the network-coded packet from the relay station, wherein the network-coded packet can be received by the base station and the at least one mobile station.

In one implementation, the portion of the re-encoded uplink transmission is not already received by the base station and the portion of the re-encoded downlink transmission is not already received by the at least one mobile station. The base station receives from the relay station the network-coded packet and recovers the portion of the re-encoded uplink transmission from the first mobile station. The recovery of the portion of the re-encoded uplink transmission from the mobile station is based on a portion of a re-encoded downlink transmission to the at least one mobile station and the network-coded packet. The base station combines the portion of the recovered re-encoded uplink transmission from the relay station with the received first uplink transmission from the first mobile station, and possibly with other previously-recovered portions of the re-encoded uplink transmission, and decodes the combined information. At least one mobile station receives the network-coded packet from the relay station and recovers the portion of the re-encoded downlink transmission from the base station. The recovery of the portion of the re-encoded downlink transmission from the base station is based on a first portion of a re-encoded uplink transmission from the first mobile station and the network-coded packet. Desirably, the at least one mobile station combines the portion of the recovered re-encoded downlink transmission from the relay station with the received downlink transmission from the base station and possibly with other previously-recovered portions of the re-encoded downlink transmission, and decodes the combined information.

In accordance with another embodiment, a method for relaying a signal in a wireless communication system comprises failing to decode in a base station a received uplink transmission transmitted from a first mobile station; successfully receiving in a second mobile station the uplink transmission transmitted from the first mobile station; transmitting a downlink transmission from the base station to the second mobile station, wherein the second mobile station fails to decode the received downlink transmission, successfully receiving in the first mobile station the downlink transmission transmitted to the second mobile station; re-encoding in the first mobile station the downlink transmission to the second mobile station; generating a first portion of the re-encoded downlink transmission; re-encoding in the second mobile station the uplink transmission from the first mobile station; generating a first portion of the re-encoded uplink transmission; network coding in the first mobile station the first portion of the re-encoded uplink transmission to be retransmitted to the base station and the first portion of the re-encoded downlink transmission transmitted to the second mobile station; and transmitting a network-coded uplink retransmission from the first mobile station comprising a network-coded version of the first portion of the re-encoded uplink transmission to be retransmitted to the base station and the first portion of the re-encoded downlink transmission transmitted to the second mobile station, wherein the network-coded uplink retransmission can be received by the base station and the second mobile station.

The base station receives the network-coded uplink retransmission packet from the first mobile station and recovers the first portion of the re-encoded uplink transmission retransmitted from the first mobile station. The base station combines the first portion of the recovered re-encoded uplink transmission from the first mobile station with the received uplink transmission from the first mobile station, and possibly with other previously-recovered portions of the re-encoded uplink transmission, and decodes the combined information. The second mobile station receives the network-coded uplink retransmission packet from the first mobile station and recovers the first portion of the re-encoded downlink transmission. The second mobile station combines the first portion of the recovered re-encoded downlink transmission with the received downlink transmission from the base station, and possibly with other previously-recovered portions of the re-encoded downlink transmission, and decodes the combined information.

It is to be understood that both the foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the claimed subject matter and are incorporated in and constitute a part of this specification, illustrate various embodiments together with the description serve to explain the recited principles. Different features, elements, and aspects that are referenced by the same numerals in different figures represent the same, equivalent, or similar features, elements, or aspects in accordance with one or more embodiments.

FIG. 3 illustrates an exemplary frame structure for scheduling the transmission of a UL message and a DL message over a common NC sub-frame, in accordance with one embodiment.

FIGS. 8A and 8B illustrate an exemplary communication environment in accordance with one embodiment in which a neighboring sector's uplink retransmission may be used for downlink interference cancellation.

DETAILED DESCRIPTION OF EXAMPLE EMBODIMENTS

Figure 1:
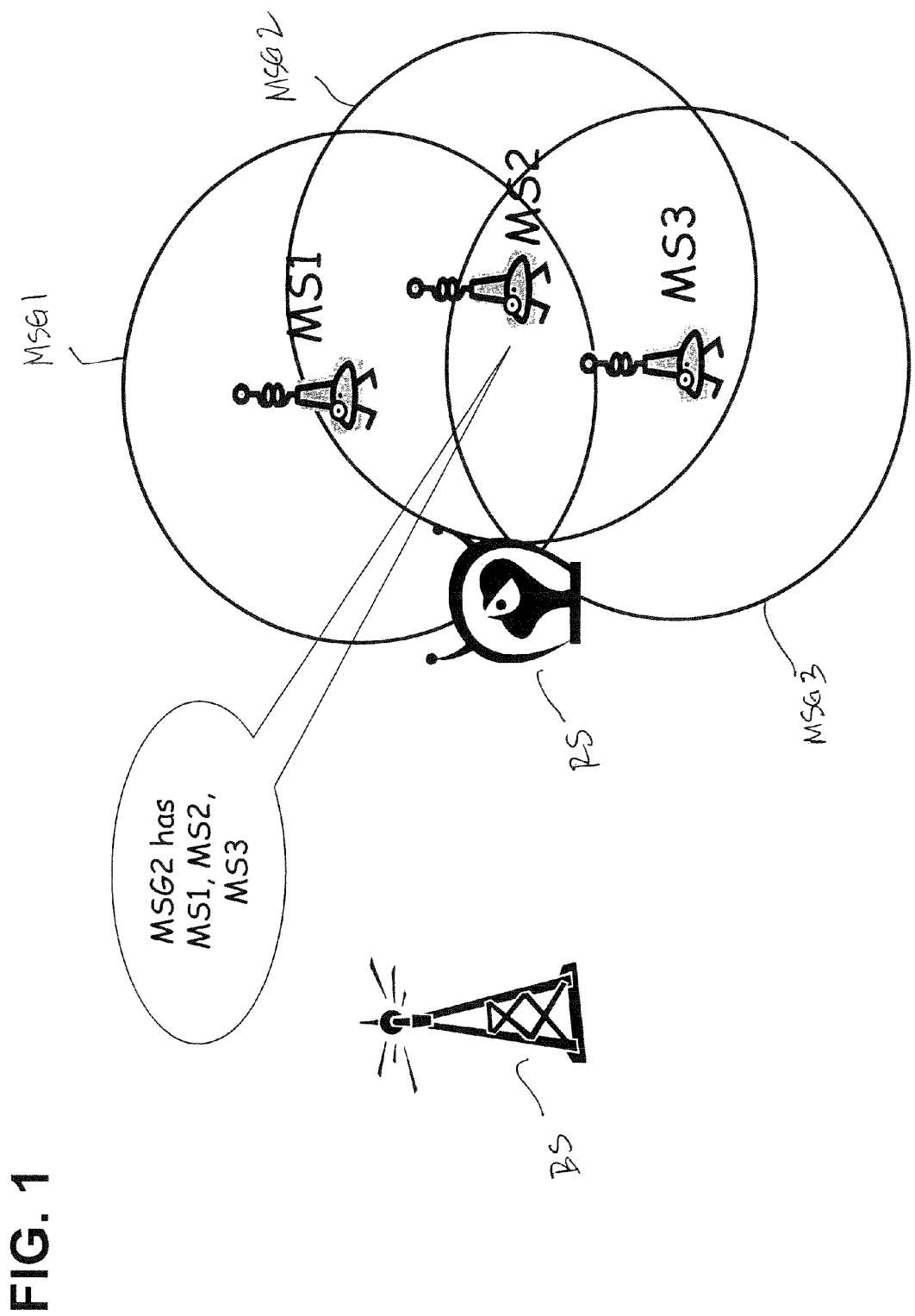
FIG. 1 illustrates an exemplary communication environment in accordance with one embodiment wherein a plurality of MSs are members of an MS group.

Referring to FIG. 1, an exemplary communication environment in accordance with one embodiment comprises at least one base station (BS) and relay station (RS) and a plurality of mobile stations (MSs) (e.g., MS1, MS2, MS3). Each MS may be a member of one or more MS groups. For example, MS1, MS2 and MS3 maintain three separate MS groups (e.g., MSG1, MSG2, MSG3, respectively). As illustrated, however, depending on geographic location and proximity of the MSs together, at a certain window of time the three MSs may fall within the perimeter of a single MS group such as MSG2.

The BS and RS may receive information regarding the MS group (MSG) of an MS. Preferably, the MSG comprises a group of neighboring MSs from which an MS is capable of successfully receiving uplink transmissions. The information regarding the MSG of the MS may be received periodically. Moreover, the information regarding the MSG of one MS may be received asynchronously with the reception of the information regarding the MSG of another MS. If an MS2 overhears an MSG report from the MS1, the MS2 can include the MS1 in the next MSG report from MS2.

In accordance with one embodiment, information regarding the MSG of an MS may affect transmission scheduling. This is because a BS scheduler may prefer to pair an uplink transmission from an MS in an MSG where a BS has a scheduled downlink transmission to take advantage of the benefits of network coding.

Figure 2A:
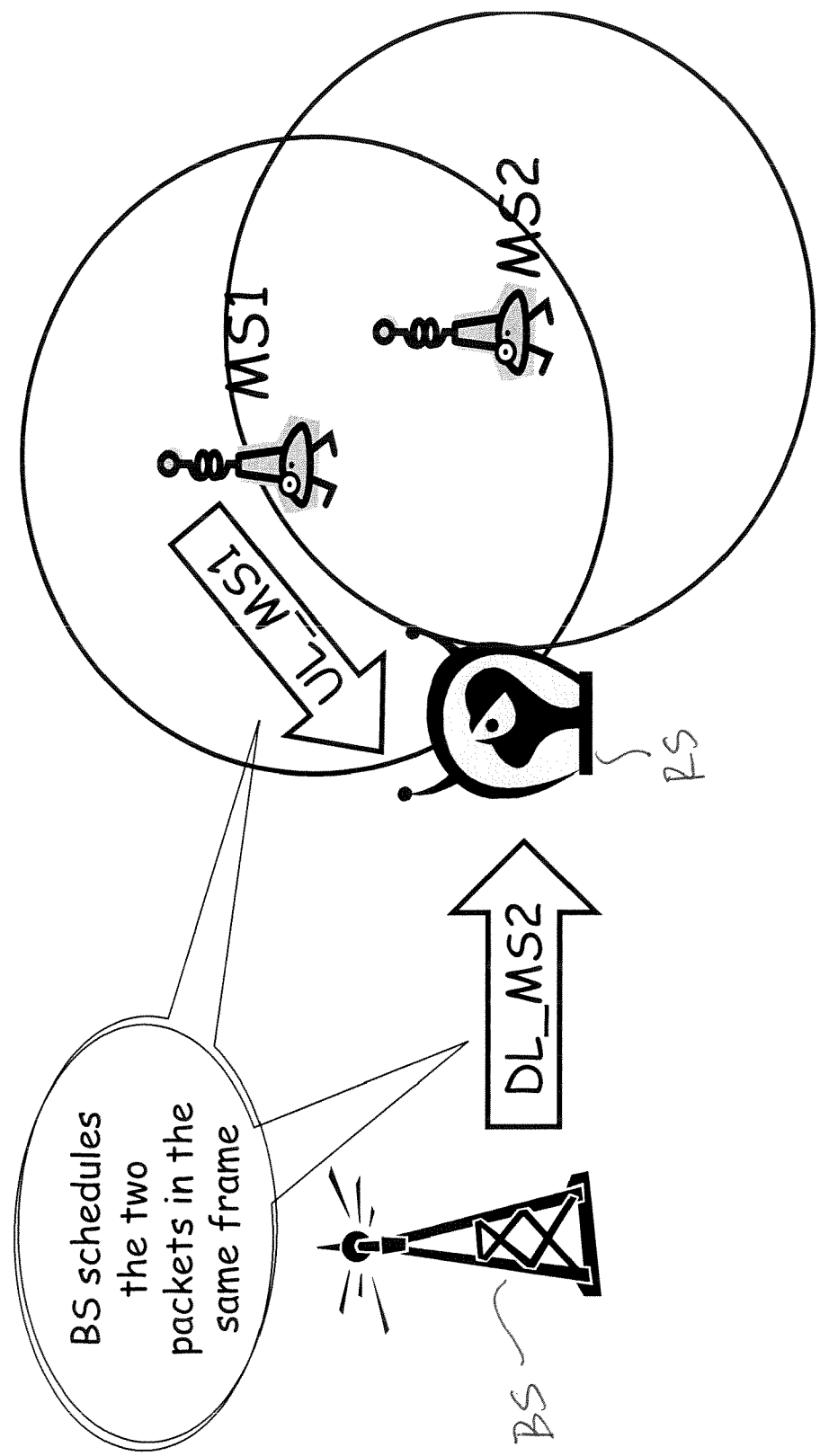
FIG. 2A illustrates an exemplary communication environment in accordance with one embodiment in which BS schedules a UL packet and a DL packet in the same frame.

Referring to FIG. 2A, MS1 or MS2 can communicate with the BS by way of the RS. That is, MS1, for example, transmits a message UL_MS1 over a UL channel to the BS, and the RS will in turn transmit the received UL_MS1 message. On the other end, the BS may transmit a message DL_MS2 intended for MS2 to the RS over the DL channel, and the RS will in turn transmit the received DL_MS2 message to MS2. In accordance with one embodiment, the BS or the RS schedules both the UL and the DL transmissions (i.e., UL_MS1 and DL_MS2) discussed above within a predetermined duration, or in the same frame, to take advantage of network coding (NC) at the RS.

In one embodiment, the RS does not send messages to the BS and MS2 separately. Instead, the UL_MS1 message and the DL_MS2 message are network coded in the RS. Accordingly, the relay station may transmit a network-coded packet comprising a network-coded version of the UL_MS1 message and the DL_MS2 message, wherein the network-coded packet may be received by both the BS and MS2. The relay station may transmit the network-coded packet by multicasting. Preferably, the relay station applies an "exclusive or" (XOR) operation to the UL_MS1 message and the DL_MS2 message to enable the BS or MS2 to recover the message it is intended to receive.

Accordingly, by network coding uplink and downlink transmissions in the relay station, and applying an XOR operation thereto, a major benefit is realized. For example, bandwidth consumption by the relay station is significantly reduced because one resource for the relay is used instead of two.

Figure 2B:
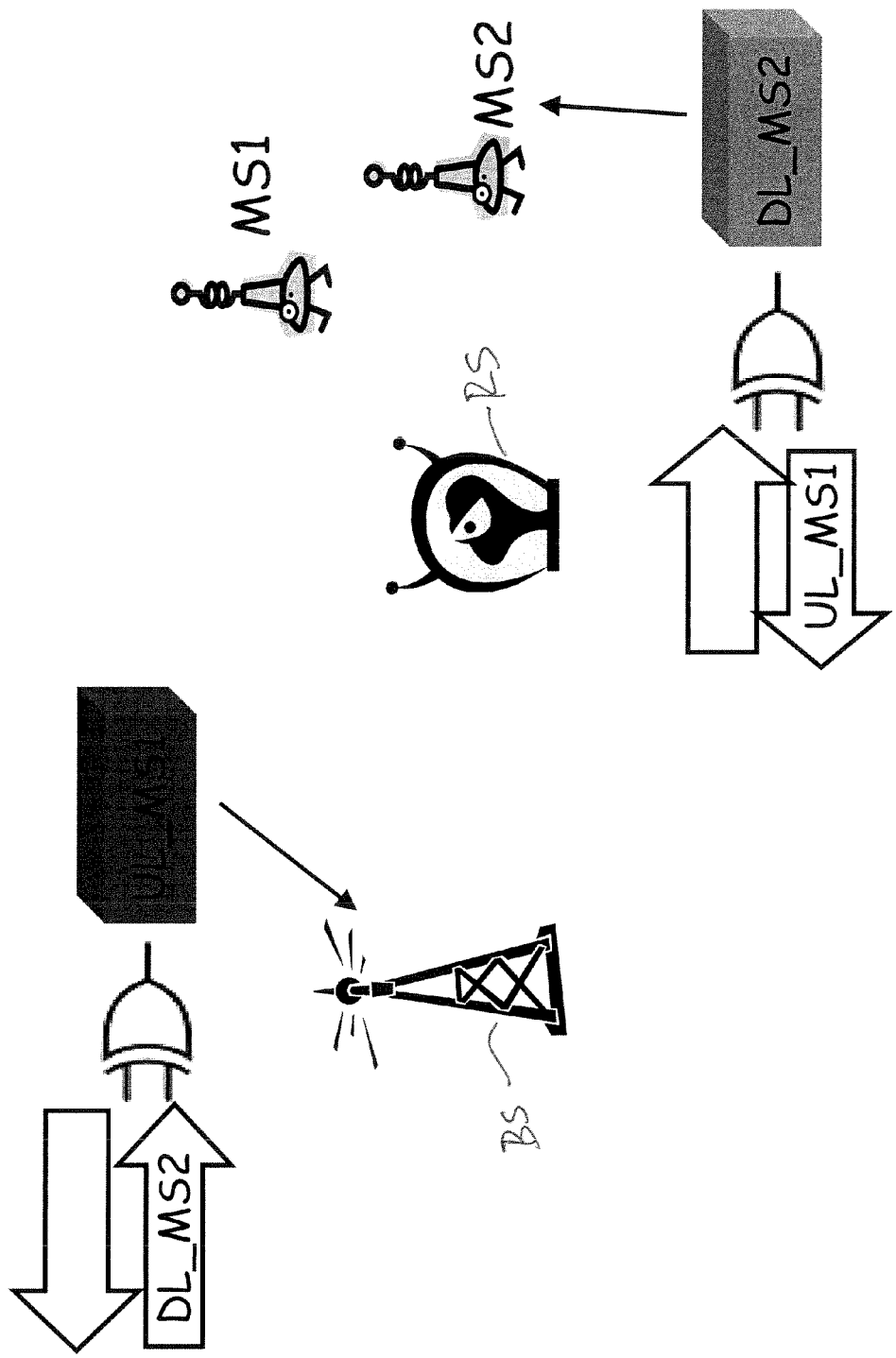
FIG. 2B illustrates an exemplary communication environment in accordance with one embodiment in which the BS or MS recovers a message from a received frame using an XOR operation.

Referring to FIG. 2B, when the BS receives the network-coded packet, the BS may recover the UL_MS1 message by utilizing previously-transmitted downlink information, such as the DL_MS2 message, in an XOR operation. Similarly, when MS2 receives the network-coded packet, MS2 may recover the DL_MS2 message by utilizing uplink information from MS1 previously received by MS2, such as the UL_MS1 message, or previously-received downlink information, in an XOR operation. MS2 may send an acknowledgment signal (ACK) to the RS that it has received the UL_MS1 message intended for the BS prior to network coding occurring in the RS.

A frame or sub-frame refers to a period of time in which data packets of fixed or variable length which has been encoded by a data link layer communications protocol can be scheduled and transmitted over a node-to-node link. Each frame or sub-frame may comprise a header for frame synchronization, scheduling information (resource assignment) and payload (i.e., the actual data). As shown in FIG. 3, an exemplary frame structure according to one implementation comprises a preamble, a map, a DL sub-frame, a UL sub-frame and a NC sub-frame. The map portion of the frame comprises the information used by RS to construct an NC sub-frame from the DL and UL sub-frames, so that desirably both UL_MS1 and DL_MS2 are scheduled to be transmitted to the RS within a certain duration such that the RS would be able to pair the two packets and apply network coding without buffering one of the packets for a long period of time.

Figure 4:
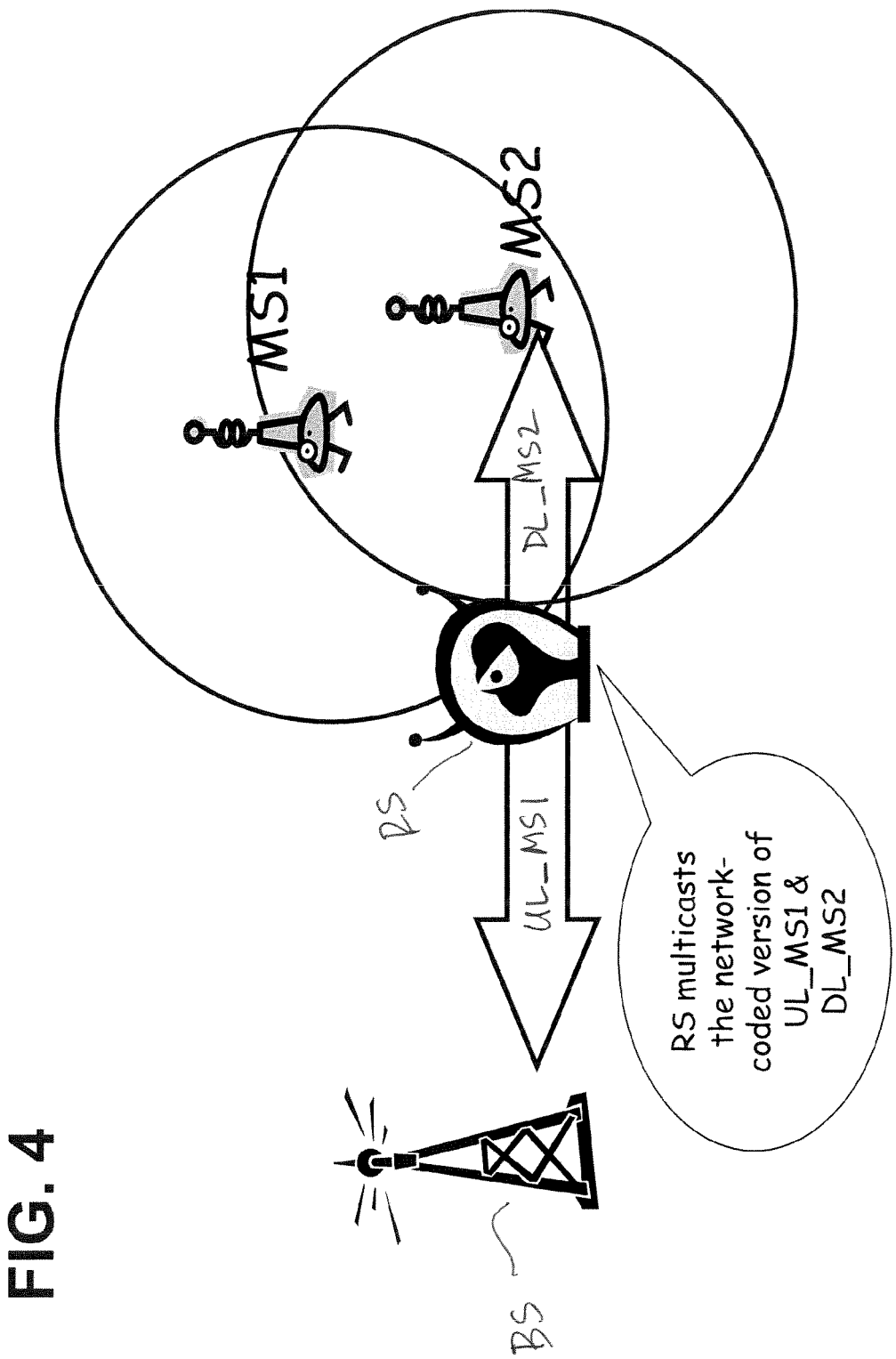
FIG. 4 illustrates an exemplary communication environment in accordance with one embodiment in which a UL and a DL message are multicasted to the intended destinations, each over an NC sub-frame.

Referring to FIGS. 3 and 4, the RS constructs an NC sub-frame from sub-frames including the UL_MS1 and DL_MS2, according to the mapping information included in the frame. RS then multicasts the NC version of UL_MS1 and DL_MS2 to the respective destination for each message over the NC sub-frame. For example, in the NC sub-frame UL_MS1 is transmitted to the BS by the RS and DL_MS2 is transmitted to MS2 by the RS over the same air link resources. In certain embodiments, a retransmission scheme is implemented in case one of the messages is not received by the intended recipient (e.g., a MS or a BS).

In accordance with one embodiment, a cooperative relay operation is supported. To support cooperative relay, the RS does not transmit a separated coded PHY packet in an NC sub-frame to be independently decoded before a recovery procedure occurs at a receiving side (BS or MS). Instead, the RS re-encodes uplink and downlink packets it has received, and transmits the XOR of the parity bits. The BS or MS may then use its own locally-stored parity bits (e.g. generated when encoding the packet transmitted to the RS) to descramble (XOR) the received network-coded packet to recover the parity bits, and decode the packets. Preferably, the receiving side (BS or MS) combines information from both the source (MS or BS) and RS (after descrambling) to decode a packet. Accordingly, cooperative relay with reduced RS bandwidth consumption is realized.

In one aspect of the cooperative relay operation, incremental redundancy occurs at a receiving side. The RS re-encodes both the UL and DL packet, network codes (XOR) the parity bits generated by re-encodings, and transmits the network-coded parity bits. The BS or MS will continue to decode as these network-coded parity bits are received and descrambled until the entire packet is decoded. Moreover, as stated above, the receiving side may combine information from both the source and RS to decode a packet. Thus, for example, if the MS cannot immediately decode a group of encoded bits received from the BS, the MS may in the NC sub-frame receive network-coded bits from the RS, and thereafter descramble the network-coded parity bits and decode after combining all bits received from the RS and BS together. As such, the MS may incrementally collect bits in order to decode a packet.

In another aspect of the cooperative relay operation, sizes of information bits of an uplink packet and a downlink packet may not be the same. By applying network coding after channel coding as stated above, the RS can transmit a network-coded packet on the NC sub-frame with the same number of encoded bits for both directions. With this approach, bandwidth consumption is reduced by network coding without restricting the sizes of information bits of the UL/DL packets, and packet formats (code rate in channel coding) remain the same.

Figure 5:
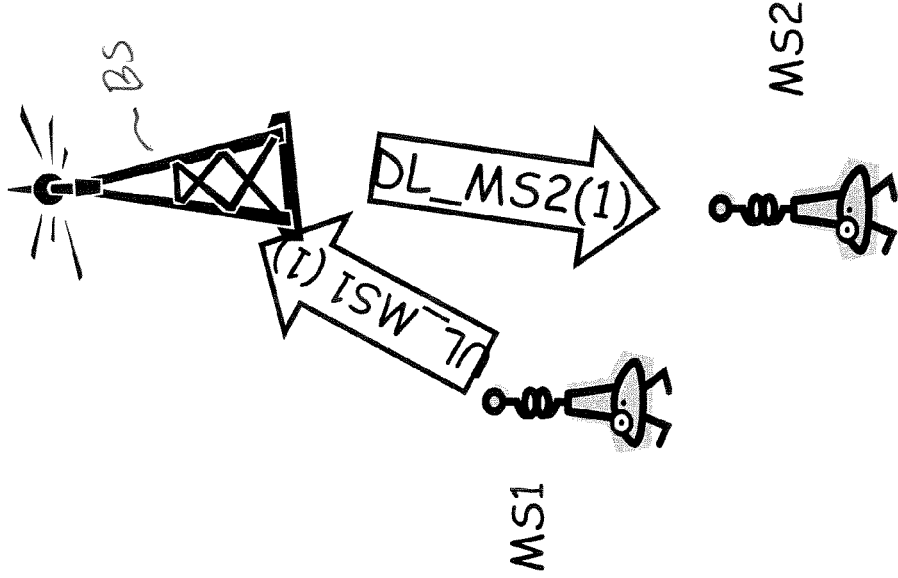
FIGS. 5, 6 and 7 illustrate an exemplary communication environment in accordance with one embodiment in which lost messages are recoverable using a first recovery scheme.

Referring to FIG. 5, in an exemplary scenario, MS2 may fail to decode a message transmitted to MS2 from the BS (e.g., MS2 failed to decode DL_MS2 (1)). MS1 and MS2 are members of each other's MSG. MS1 may receive DL_MS2 (1) intended for MS2, if MS1 is positioned in a relatively better reception area in relation to the BS in contrast to MS2.

Still referring to FIG. 5, in the same scenario, BS may also fail to decode a message transmitted to the BS from MS1 (e.g., BS failed to decode UL_MS1(1)). Again, if MS1 and MS2 are in each other's MSG, UL_MS1(1) intended for the BS may be decoded by MS2. Depending on implementation, MS1 may not have information about whether MS2 has decoded UL_MS1(1).

Figure 6:
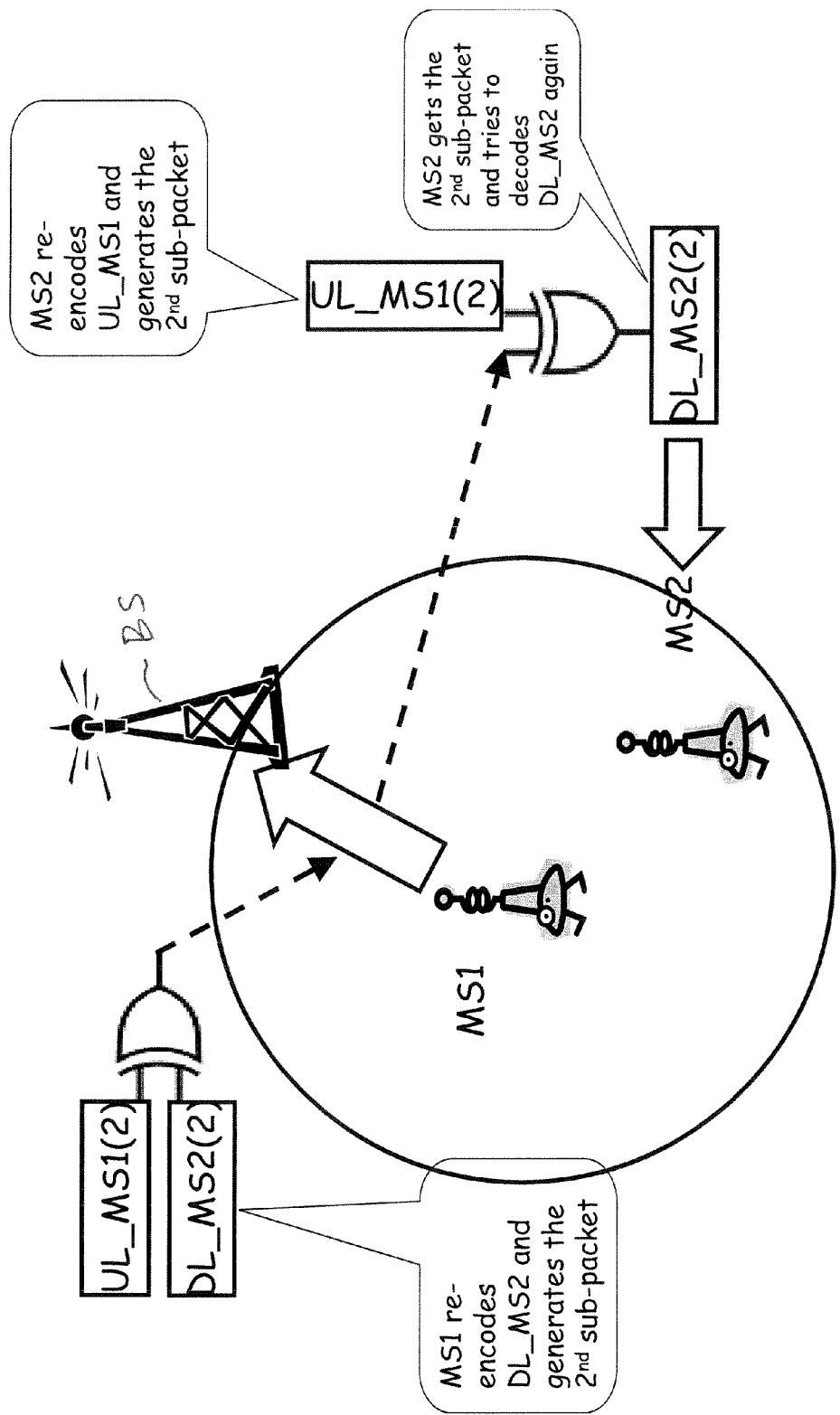

Referring to FIG. 6, in the above exemplary scenarios, if it is determined that BS has failed to decode UL_MS(1), then MS1 may be requested to re-encode DL_MS2(1) and generate a DL second sub-packet DL_MS2(2) and transmit it with an UL second sub-packet UL_MS1(2) by network coding. Further, MS2 may be requested to re-encode UL_MS1(1) and generate a second sub-packet UL_MS1(2). MS2 may then receive the network-coded packet of DL_MS2(2) and UL_MS1(2), and try to recover DL_MS2(2) using an XOR operation, for example.

Figure 7:
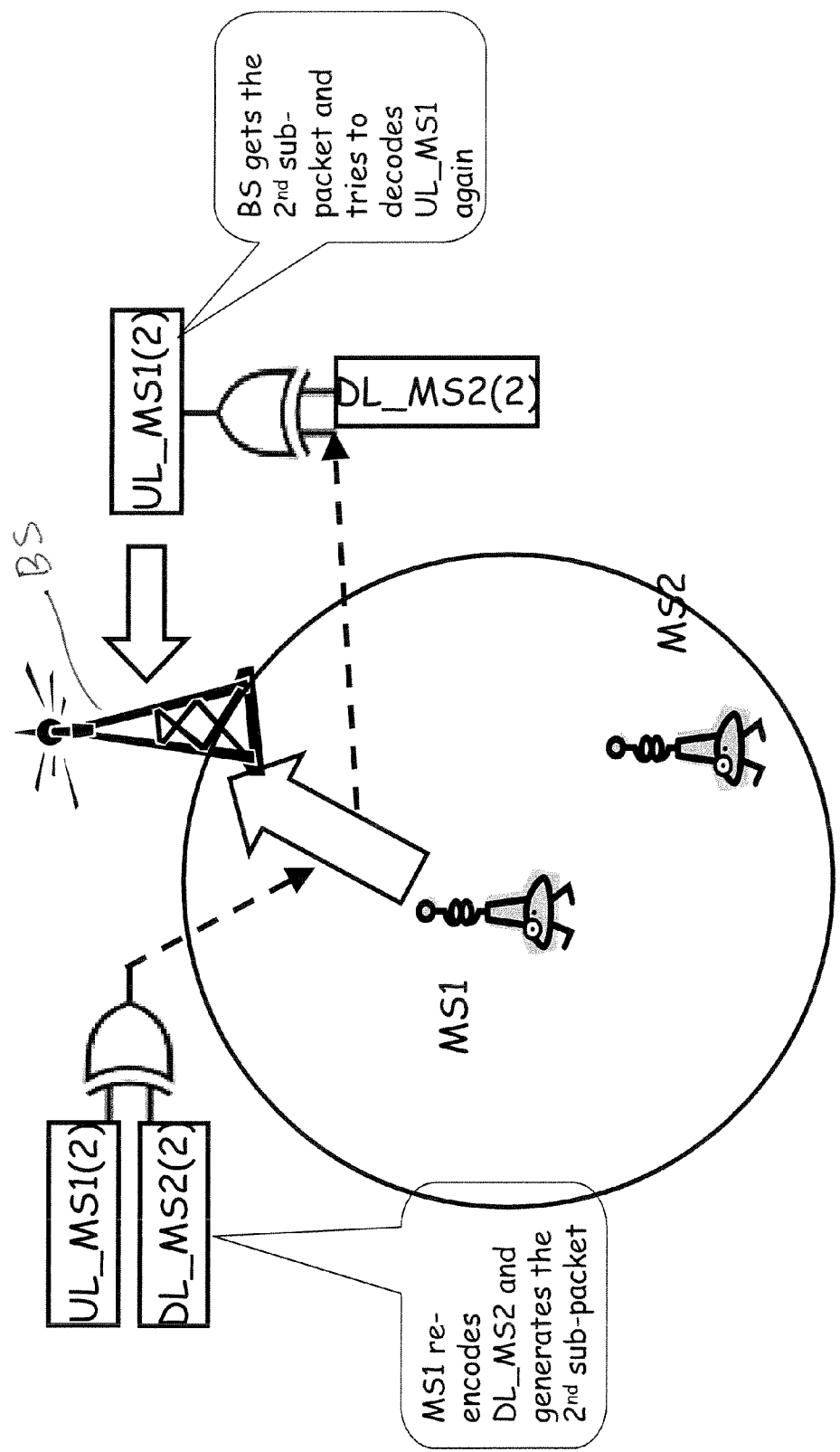

Referring to FIG. 6, MS2 may use information received over the NC sub-frame (e.g., the second sub-packet DL_MS2 (2) in combination with UL_MS1(2)) and use that information in an XOR operation to recover DL_MS1(2). MS2 thus may try to decode UL_MS1(1) again. Similar operations at BS are depicted in FIG. 7.

Figure 8A:
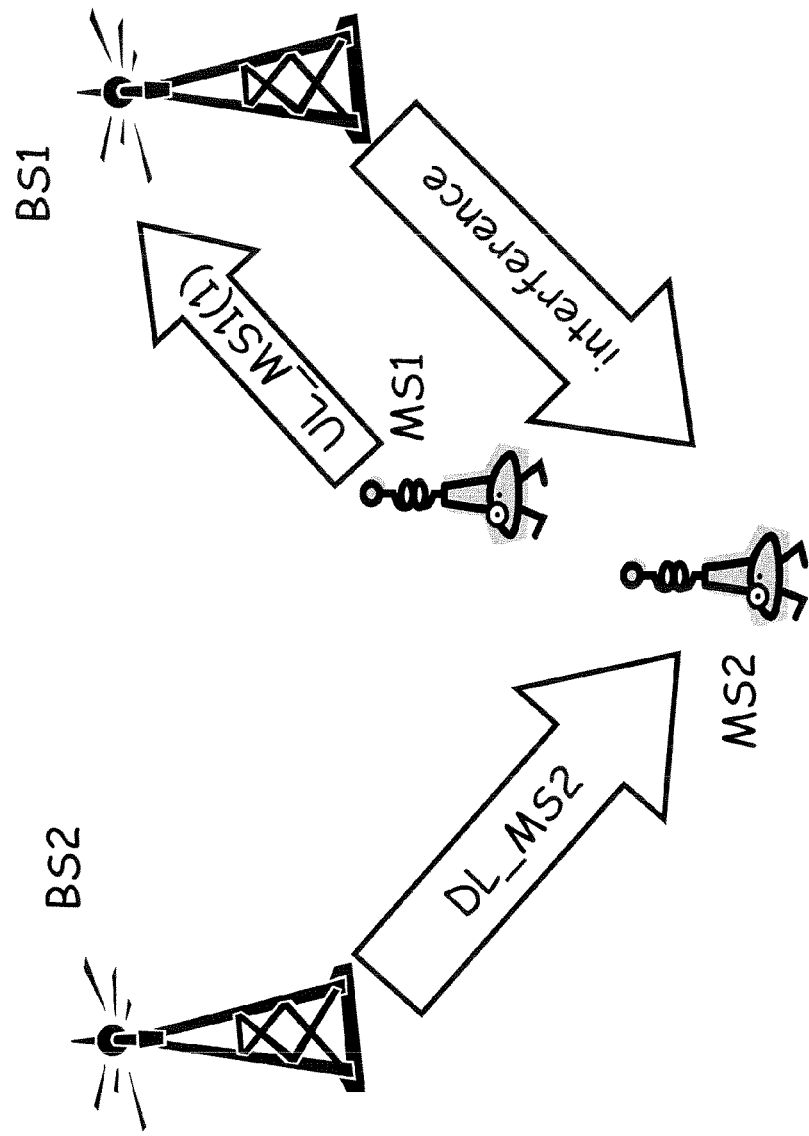

In accordance with one embodiment of the present invention, a neighboring sector's uplink H-ARQ retransmission can be used for downlink interference cancellation. Referring to FIG. 8A, MS2 belonging to a sector of BS2 is scheduled to receive a DL_MS2. However, MS2 receives downlink interference from BS1 of a neighboring sector, and therefore cannot decode DL_MS2. Meanwhile, MS1 of the neighboring sector transmits UL_MS1(1) to BS1. However, BS1 cannot decode UL_MS1(1) also due to the downlink interference from BS1.

Accordingly, referring to FIG. 8B, MS1 retransmits a packet comprising an XOR of an interfering packet and the 2nd sub-packet of UL_MS1, UL_MS1(2), in order for BS1 to be able to decode UL_MS1(1). Consequently, MS2 may receive the retransmitted packet containing the interfering packet. As such, MS2 may recover the interfering packet and use it for interference cancellation to decode DL_MS2.

Figure 9:
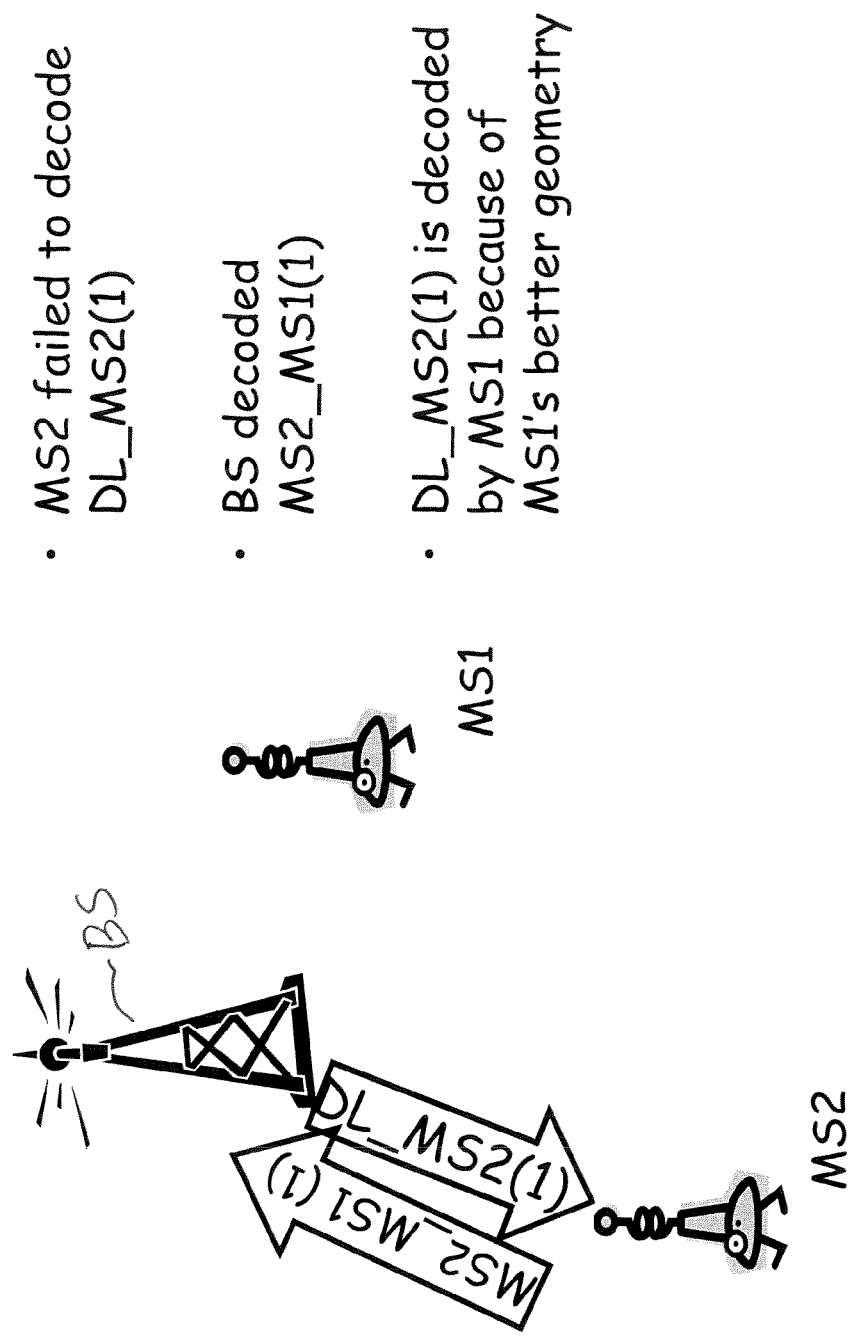
FIGS. 9, 10 and 11 illustrate another exemplary communication environment in accordance with one embodiment in which lost messages are recoverable using a second recovery scheme.
Figure 10:
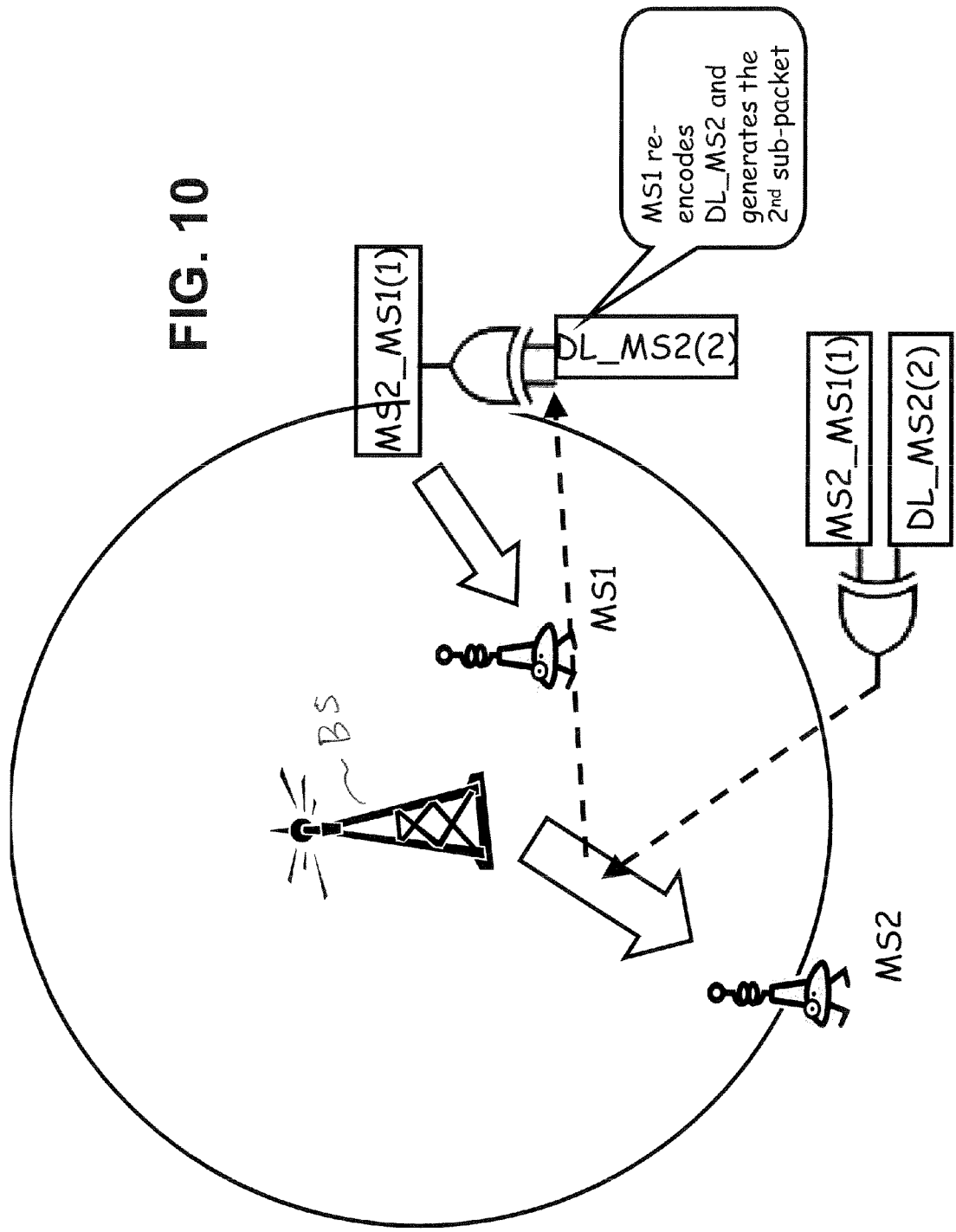

Referring to FIG. 9, another exemplary scenario is provided in which BS transmits DL_MS2(1) to MS2, and MS2 transmits a message (i.e., MS2_MS1(1)), designated for delivery to MS1 in the same sector, to the BS. MS2 may fail to decode DL_MS2(1) transmitted by the BS. If MS1 is in a better reception area, then MS1 may decode DL_MS2(1) intended for the MS2 because MS1 is closer to BS. As illustrated in FIG. 10, MS1 may re-encode DL_MS2 and generate DL_MS2(2). BS can transmit a network-coded packet by applying an XOR operation to DL_MS2(2) and MS2_MS1 (1). MS1 may recover MS2_MS1(1) from the network-coded packet by descrambling the network coded packet with DL_MS2(2).

Figure 11:
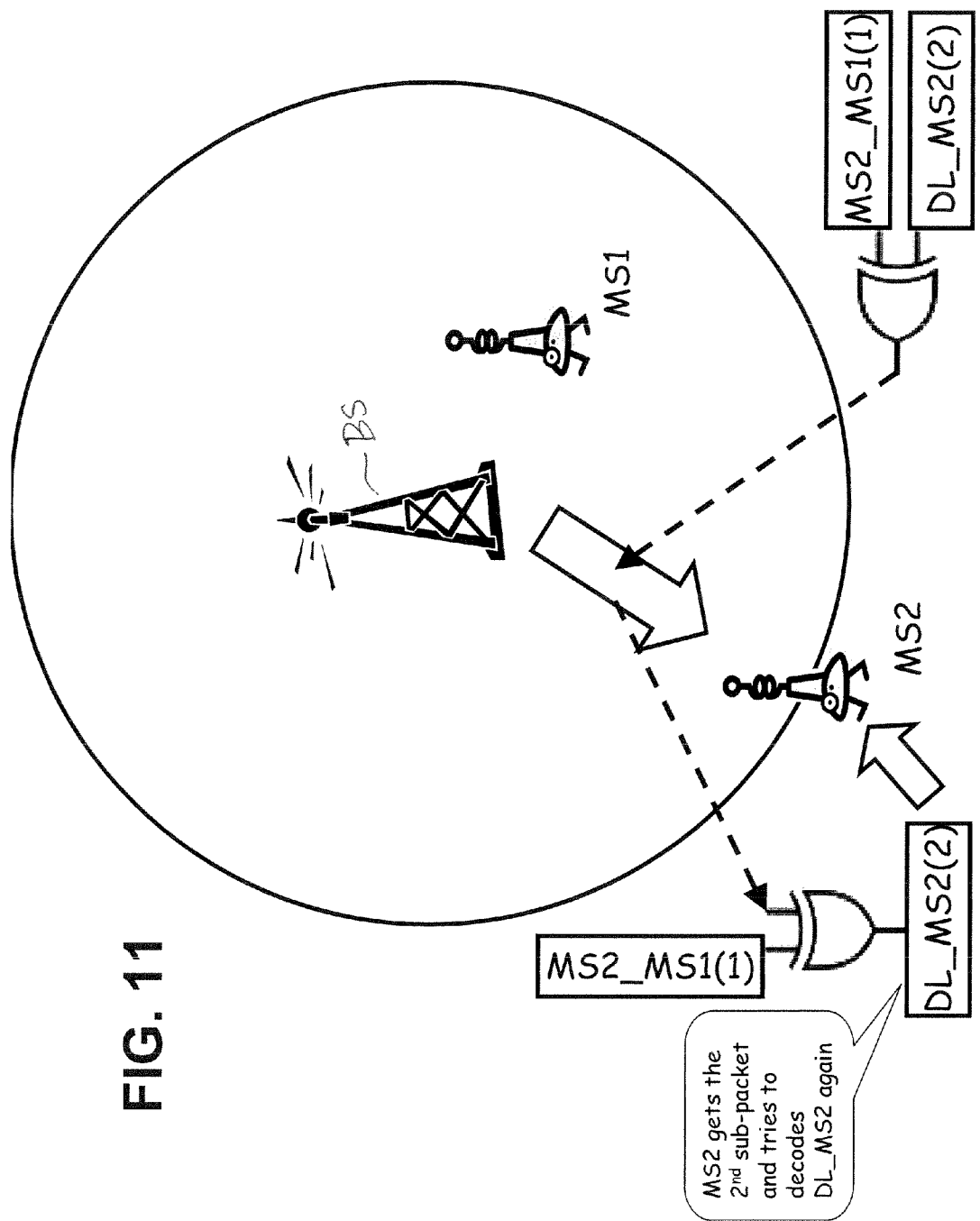

Referring to FIG. 11, BS can transmit a network-coded packet by applying an XOR operation to DL_MS2(2) and MS2_MS1(1). Thus, MS2 upon receiving the network-coded packet will attempt to recover DL_MS2(2) by descrambling the network-coded packet with MS2-MS1(1). An XOR operation may be utilized by MS2 to derive DL_MS2(2) from the information included in the network-coded packet.

The foregoing embodiments and advantages are merely exemplary and are not to be construed as limiting the scope of the claims. The present teaching can be readily applied to other types of apparatuses. The description is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for relaying a signal in a wireless communication system, the method comprising:

receiving in at least one of a base station and a relay station information regarding a mobile station group (MSG) of a mobile station, wherein the MSG comprises a group of neighboring mobile stations from which the mobile station is capable of successfully receiving uplink transmissions;

scheduling within a given duration uplink information to be transmitted from a first mobile station and downlink information to be transmitted to at least one mobile station, wherein the first mobile station is in each of the at least one mobile station's MSG;

receiving in a relay station the uplink information transmitted from the first mobile station and the downlink information to be transmitted to the at least one mobile station within the given duration;

network coding the uplink information and the downlink information in the relay station by applying an exclusive-or (XOR) operation to a network-coded packet including the uplink information and the downlink information; and transmitting from the relay station the network-coded packet comprising a network-coded version of the uplink information from the first mobile station and the downlink information to be transmitted to the at least one mobile station, wherein the network-coded packet can be received by the base station and the at least one mobile station.

2. The method of claim 1, wherein the relay station is a mobile station.

3. The method of claim 1, wherein one of the at least one mobile stations is a relay station.

4. The method of claim 1, wherein the first mobile station is a relay station.

5. The method of claim 1, wherein the first mobile station is one of the at least one mobile stations.

6. The method of claim 1, wherein the information regarding the mobile station group of the mobile station is received periodically.

7. The method of claim 1, wherein the information regarding the mobile station group of one mobile station is received asynchronously with the reception of the information regarding the mobile station group of another mobile station.

8. The method of claim 1, wherein the relay station multicasts the network-coded packet.

9. The method of claim 1, wherein the base station receives the network-coded packet and recovers the uplink information from the first mobile station.

10. The method of claim 9, wherein the recovery of the uplink information from the first mobile station is based on previously-transmitted downlink information and the network-coded packet.

11. The method of claim 1, wherein the at least one mobile station receives the network-coded packet and recovers the downlink information.

12. The method of claim 11, wherein the recovery of the downlink information is based on previously-received uplink information from the first mobile station and the network-coded packet.

13. A method for relaying a signal in a wireless communication system, the method comprising:

scheduling within a given duration a first uplink transmission from a first mobile station and a downlink transmission transmitted to at least one mobile station, wherein the first mobile station is in each of the at least one mobile station's mobile station group (MSG);

receiving in a base station the first uplink transmission from the first mobile station;

receiving in the at least one mobile station the downlink transmission from the base station;

receiving in a relay station the first uplink transmission from the first mobile station and the downlink transmission to the at least one mobile station;

decoding in the relay station the first uplink transmission transmitted from the first mobile station and the downlink transmission to the at least one mobile station;

re-encoding in the relay station the uplink transmission and the downlink transmission;

network coding in the relay station a portion of the re-encoded uplink transmission and a portion the re-encoded downlink transmission, wherein a network-coded packet is generated from the portion of the re-encoded uplink transmission and the portion the re-encoded downlink transmission; and transmitting the network-coded packet from the relay station, wherein the network-coded packet can be received by the base station and the at least one mobile station.

14. The method of claim 13, wherein the portion of the re-encoded uplink transmission is not already received by the base station and the portion of the re-encoded downlink transmission is not already received by the at least one mobile station.

15. The method of claim 13, wherein the base station receives from the relay station the network-coded packet and recovers the portion of the re-encoded uplink transmission from the first mobile station.

16. The method of claim 15, wherein the recovery of the portion of the re-encoded uplink transmission from the mobile station is based on a portion of a re-encoded downlink transmission to the at least one mobile station and the network-coded packet.

17. The method of claim 15, wherein the base station combines the portion of the recovered re-encoded uplink transmission from the relay station with the received first uplink transmission from the first mobile station, and possibly with other previously-recovered portions of the re-encoded uplink transmission, and decodes the combined information.

18. The method of claim 13, wherein the at least one mobile station receives the network-coded packet from the relay station and recovers the portion of the re-encoded downlink transmission from the base station.

19. The method of claim 18, wherein the recovery of the portion of the re-encoded downlink transmission from the base station is based on a first portion of a re-encoded uplink transmission from the first mobile station and the network-coded packet.

20. The method of claim 18, wherein the at least one mobile station combines the portion of the recovered re-encoded downlink transmission from the relay station with the received downlink transmission from the base station, and possibly with other previously-recovered portions of the re-encoded downlink transmission, and decodes the combined information.

21. The method of claim 18, wherein the at least one mobile station:
receives the first uplink transmission from the first mobile station;
decodes the first uplink transmission transmitted from the first mobile station
re-encodes the uplink transmission; and
generates the first portion of the re-encoded uplink transmission.

22. The method of claim 13, wherein one of the at least one mobile stations is a relay station.

23. The method of claim 13, wherein the first mobile station is a relay station.

24. The method of claim 13, wherein the first mobile station is one of the at least one mobile stations.

25. A method for relaying a signal in a wireless communication system, the method comprising:
failing to decode in a base station a received uplink transmission transmitted from a first mobile station;
successfully receiving in a second mobile station the uplink transmission transmitted from the first mobile station;
transmitting a downlink transmission from the base station to the second mobile station, wherein the second mobile station fails to decode the received downlink transmission;
successfully receiving in the first mobile station the downlink transmission transmitted to the second mobile station;
re-encoding in the first mobile station the downlink transmission to the second mobile station;
generating a first portion of the re-encoded downlink transmission;
re-encoding in the second mobile station the uplink transmission from the first mobile station;
generating a first portion of the re-encoded uplink transmission;
network coding in the first mobile station the first portion of the re-encoded uplink transmission to be retransmitted to the base station and the first portion of the re-encoded downlink transmission transmitted to the second mobile station; and
transmitting a network-coded uplink retransmission from the first mobile station comprising a network-coded version of the first portion of the re-encoded uplink transmission to be retransmitted to the base station and the first portion of the re-encoded downlink transmission transmitted to the second mobile station, wherein the network-coded uplink retransmission can be received by the base station and the second mobile station.

26. The method of claim 25, wherein the base station receives the network-coded uplink retransmission packet from the first mobile station and recovers the first portion of the re-encoded uplink transmission retransmitted from the first mobile station.

27. The method of claim 26, wherein the base station combines the first portion of the recovered re-encoded uplink transmission from the first mobile station with the received uplink transmission from the first mobile station, and possibly with other previously-recovered portions of the re-encoded uplink transmission, and decodes the combined information.

28. The method of claim 25, wherein the second mobile station receives the network-coded uplink retransmission packet from the first mobile station and recovers the first portion of the re-encoded downlink transmission.

29. The method of claim 28, wherein the second mobile station combines the first portion of the recovered re-encoded downlink transmission with the received downlink transmission from the base station and possibly with other previously-recovered portions of the re-encoded downlink transmission, and decodes the combined information.

* * * * *